June 26, 1951  T. FINIZIE  2,558,294
METHOD OF COOKING FOOD
Filed Nov. 15, 1946  5 Sheets-Sheet 1

Inventor
Tommy Finizie
By Rockwell & Bartholow
Attorneys

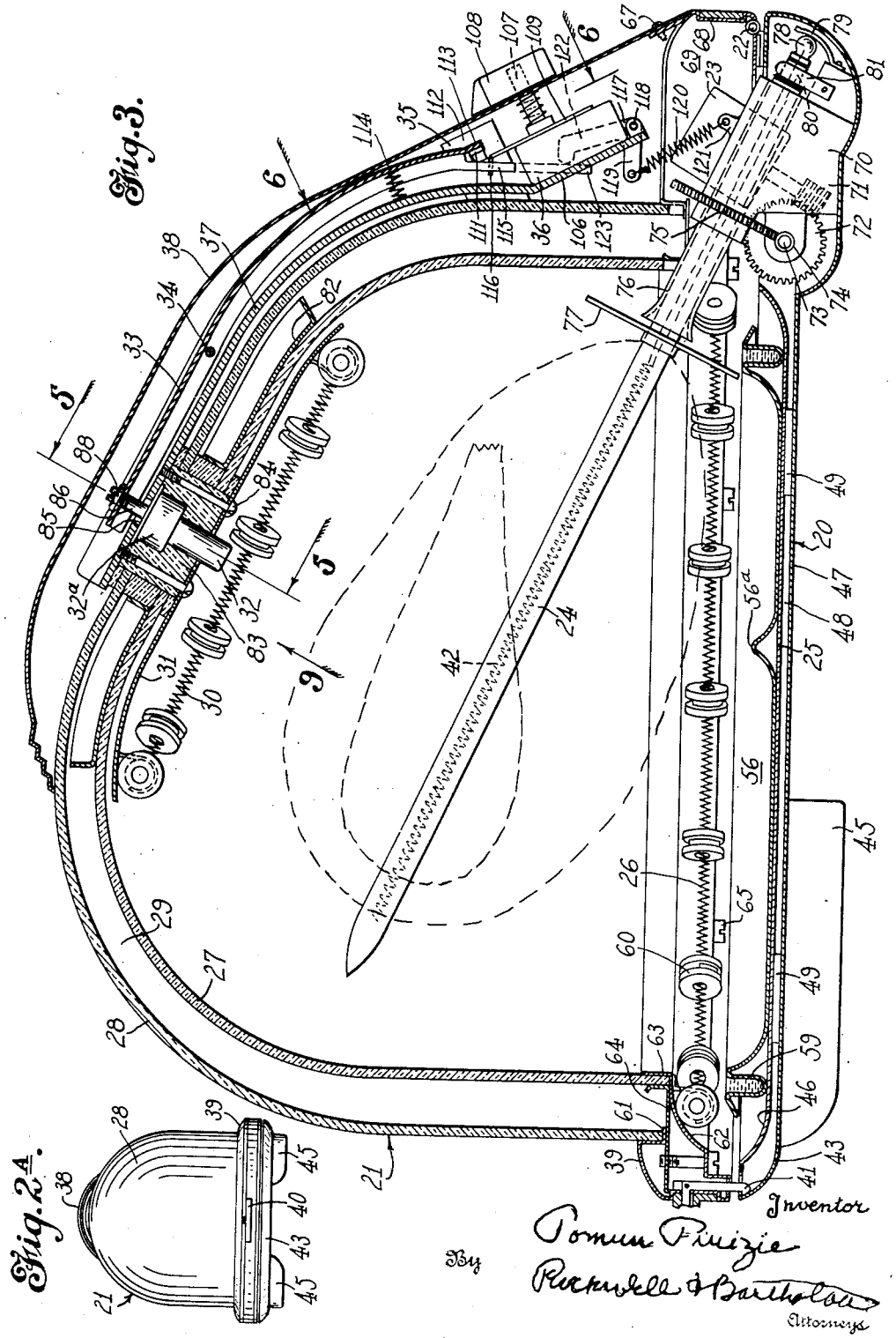

June 26, 1951 T. FINIZIE 2,558,294
METHOD OF COOKING FOOD
Filed Nov. 15, 1946 5 Sheets-Sheet 3
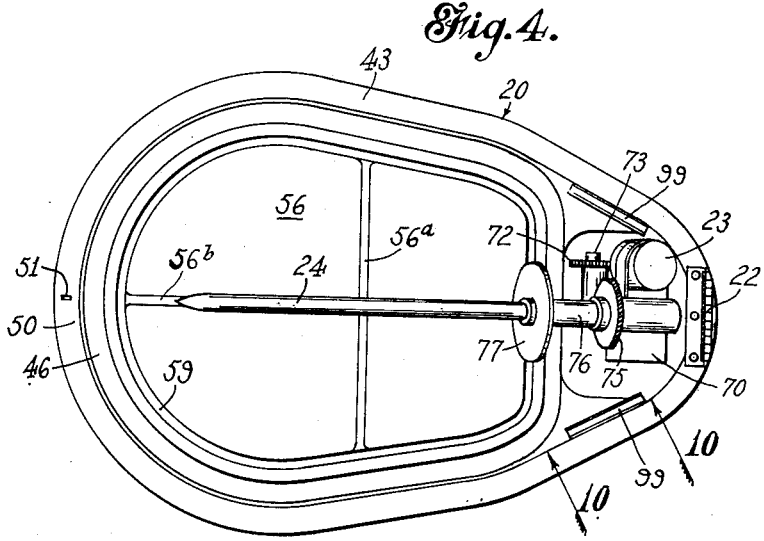
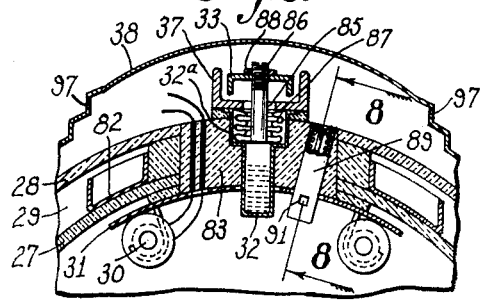
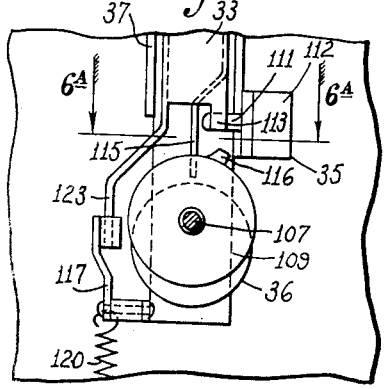
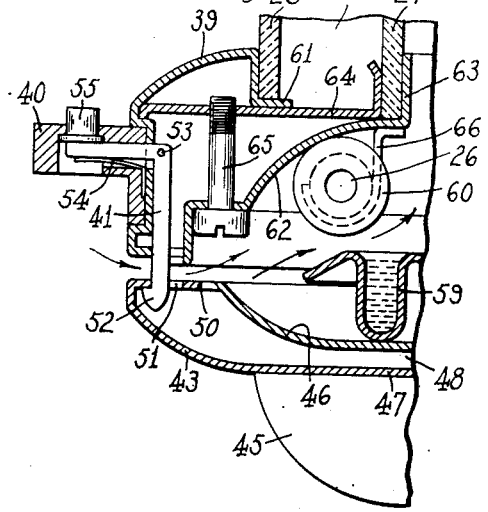
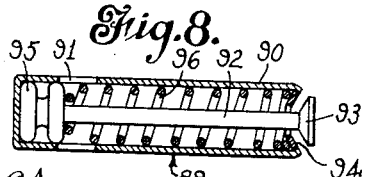
Inventor
Tomeu Finizie
By Rockwell & Bartholow
Attorneys June 26, 1951  T. FINIZIE  2,558,294
METHOD OF COOKING FOOD
Filed Nov. 15, 1946  5 Sheets-Sheet 4
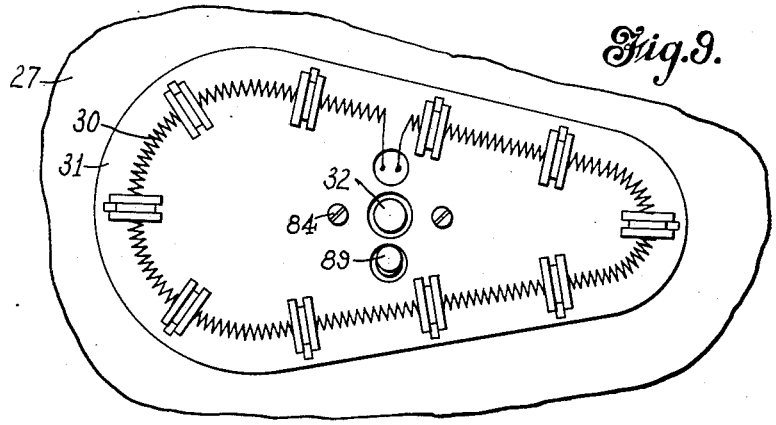
Fig. 9.
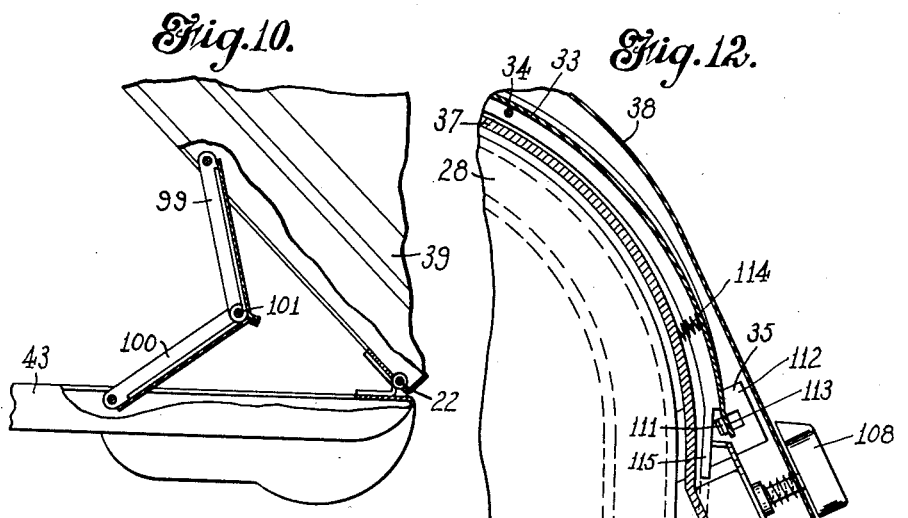
Fig. 10.
Fig. 12.
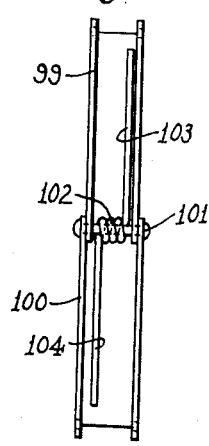
Fig. 11.
Inventor
Tomau Finizie
By Rockwell & Bartholow
Attorneys June 26, 1951  T. FINIZIE  2,558,294
METHOD OF COOKING FOOD
Filed Nov. 15, 1946  5 Sheets-Sheet 5
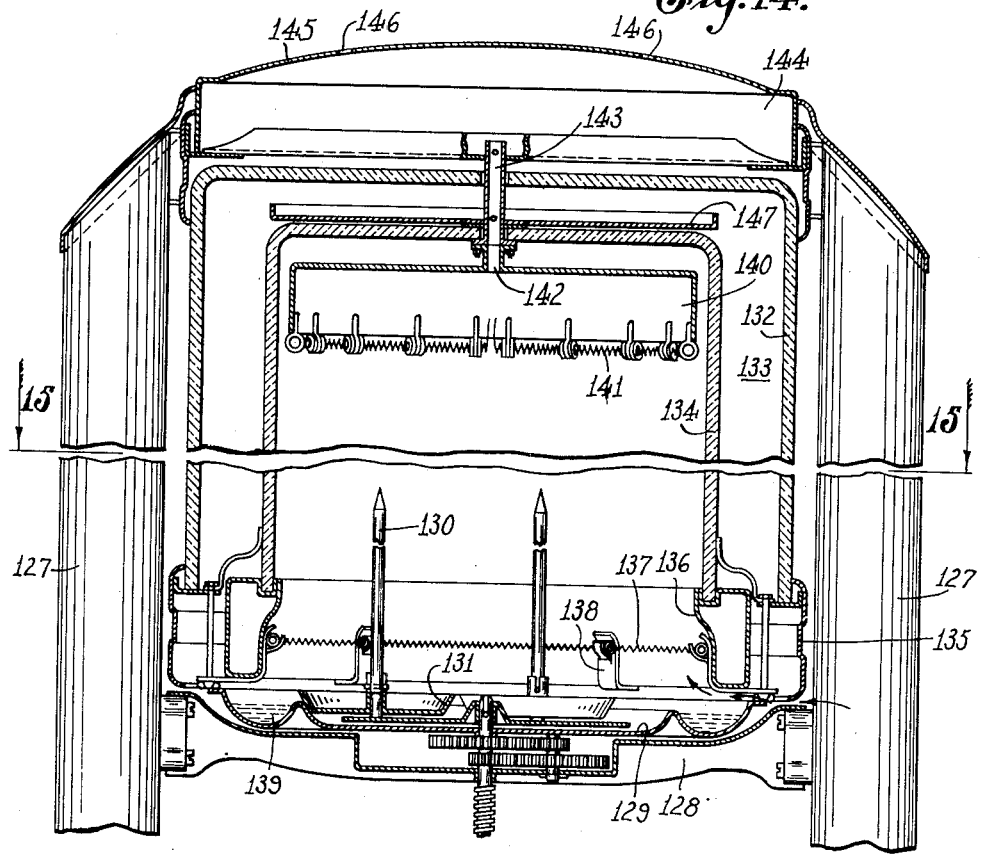
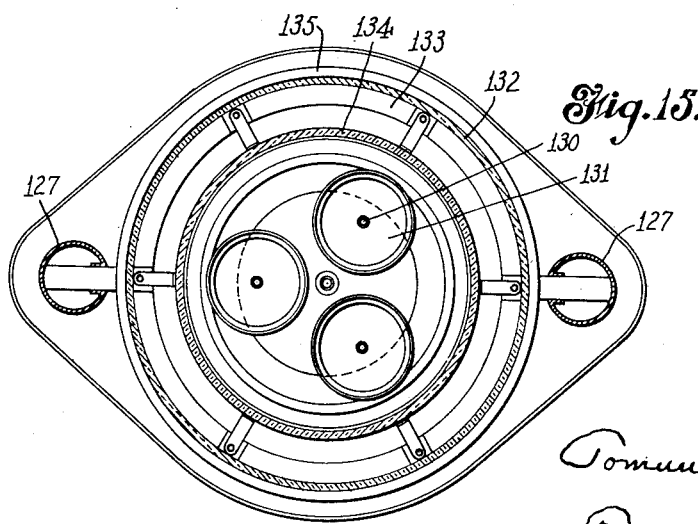

Patented June 26, 1951

2,558,294

UNITED STATES PATENT OFFICE 2,558,294

METHOD OF COOKING FOOD

Tomun Finizie, Bridgeport, Conn., assignor to Edmond J. Finizie, Bridgeport, Conn.

Application November 15, 1946, Serial No. 710,060

9 Claims. (Cl. 99—1)

This invention has for one of its objects the provision of an improved method of and means for cooking foods, and has particular reference to the cooking of articles such as chickens and roasts.

This application is a continuation in part of my application Serial No. 435,909, filed March 25, 1942, now abandoned.

Another object in view is to provide a novel method and apparatus by means of which an article of food such as a chicken can be cooked more quickly and conveniently than heretofore and with minimum shrinkage and loss of juices, and without requiring basting or like attention as the cooking proceeds.

Figure 1:
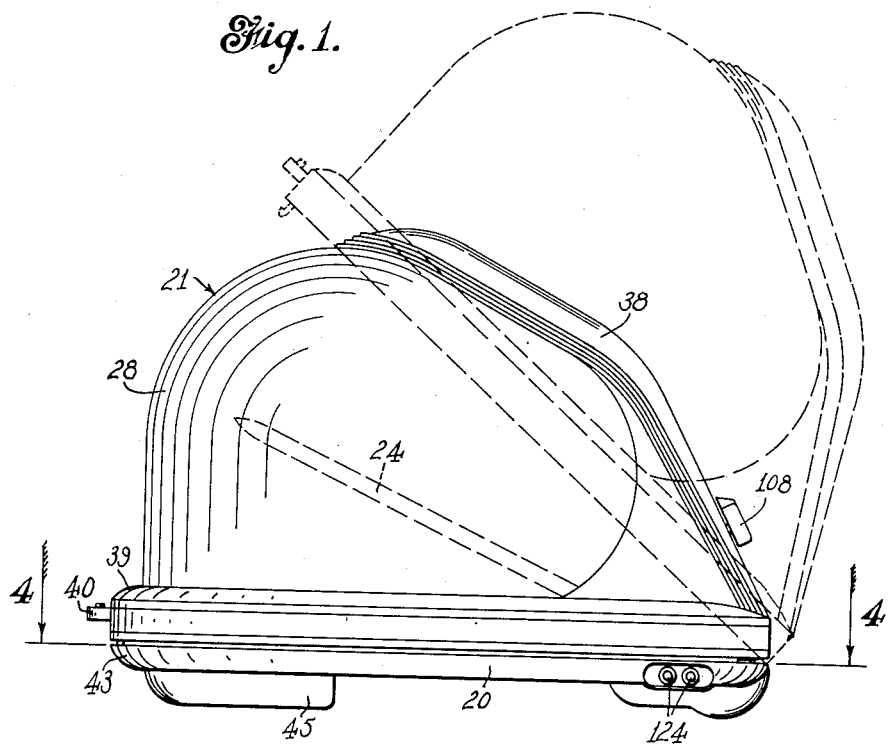
Fig. 1 is a side elevation of a small portable cooking appliance adapted for table use.
Figure 2:
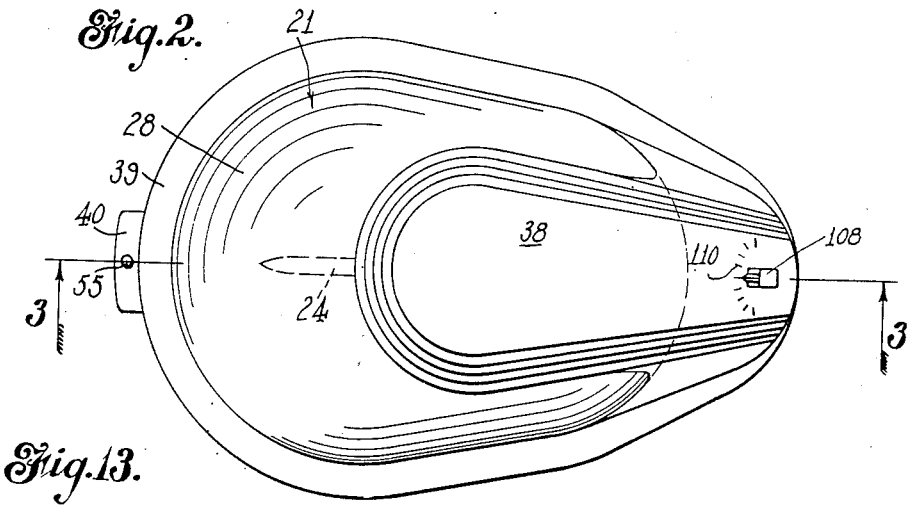
Fig. 2 is a top plan view of the same.
Figure 13:
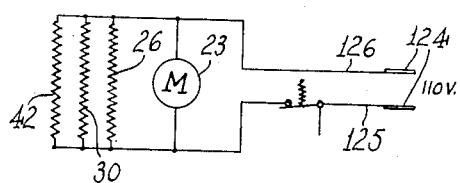

Fig. 2$^A$ is an end view on a smaller scale, looking from the left of Fig. 1;

Fig. 3 is an enlarged section on line 3—3 of Fig. 2, partly broken away;

Fig. 4 is a section on line 4—4 of Fig. 1;

Fig. 5 is a section on line 5—5 of Fig. 3;

Fig. 6 is a section on line 6—6 of Fig. 3;

Fig. 6$^A$ is a section on line 6$^A$—6$^A$ of Fig. 6;

Fig. 7 is a fragmentary enlarged sectional view of certain parts, some of which are illustrated in Fig. 3;

Fig. 8 is an enlarged section on line 8—8 of Fig. 5;

Fig. 9 is a partial bottom plan view of the upper part of the cooking chamber;

Fig. 10 is a detail view partly in section, showing the means for controlling the lifting of the upper casing portion of the appliance;

Fig. 11 is a detail elevation of the limiting member shown in Fig. 10;

Fig. 12 is a fragmentary view showing parts illustrated in Fig. 3, the controlling lever being in another position;

Fig. 13 is an electrical diagram;

Fig. 14 is a broken elevation partly in vertical section, showing a modified form of cooking apparatus; and Fig. 15 is a section on line 15—15 of Fig. 14.

The apparatus shown in Figs. 1 to 13, inclusive, is a suitable one for the practice of the method which is one part of my invention, and for convenience a description of the apparatus employed will be taken up at this point.

In its general character the appliance of Figs. 1 to 13, inclusive, is a portable cooker adapted to be used on a table and adapted for the employment of the house current, for which purpose it can be plugged in to a convenient outlet so that the electric current can produce the heating effect and can actuate a motor rotating a spit upon which is placed the article to be cooked, for example, a chicken. The casing of the appliance is constructed in two parts, one of which is a base resting on the table, and the other of which is a casing portion hinged to one side of the base. The base carries the spit and the spit-rotating motor, and certain other parts, as hereinafter described. The upper or movable casing portion is in the form of a seamless bell embodying a glass wall of a structure hereinafter described, providing the cooking chamber and equipped at the upper part with a heating unit so arranged that the heat rays radiating from the unit converge toward the spit axis. The upper part of the glass bell is also equipped adjacent the heating unit with a thermostat so constructed and arranged as to cut off the current when a certain heat is attained, as hereinafter described. The thermostat acts upon a suitable control member, illustrated here as a controlling lever, which is operable to cut off the current and to restore the circuit so as to maintain a constant temperature in the cooking chamber, and this controlling lever may also be subject to the action of a time clock, as hereinafter described.

Mounted in the base of the appliance, in a position such that it is below and close to the chicken being rotated by the spit, is an element illustrated as a pan, which in this case provides a water pool the action of which is as hereinafter described. The pan element also serves for the reflection of heat against the article of food being cooked. In connection with this pan element a heating unit carried by the lower portion of the hinged bell is used in a manner to create vapor as hereinafter described, which modifies the action of the radiant heat. Upon lifting the bell portion the pan with its water pool is conveniently accessible. The bell above mentioned may conveniently be constructed of glass embodying an inner shell and an outer shell with an air chamber between them. This air chamber acts as heat insulation so that the outer surface of the bell will be relatively cool. Means are also provided, as hereinafter described, for insulating the base portion of the casing so that its external surface will be relatively cool and will not injure the table or other support.

In the drawings, the base is indicated at 20, the hinged bell portion of the casing at 21, the hinge connecting these parts at 22, the motor mounted in the base at 23, and the spit rotated from the motor at 24. The pan element associated with the base is generally indicated at 25, and the heating element associated therewith at 26. The bell portion 21 has an inner glass shell 27, an outer glass shell 28, and an intermediate air chamber 29. The heating element in the upper portion of the cooking chamber is indicated at 30, the same having above it a metal reflector 31 for the heat rays. The thermostat previously mentioned is indicated at 32, and this is adapted to move a control lever 33, said lever being pivoted intermediate of its ends at 34 and having one end connected with the thermostat while the other end of the lever is operatively connected with a control switch 35 and with a timer 36, as hereinafter described. The lever 33 is mounted exteriorly of the glass portion of the bell 21, and is carried upon a metal part 37, as hereinafter described, serving as a mounting for some of the operative parts. These operative parts, together with the lever and its mounting, are covered over by a covering member 38, which in this instance is of metal and is disposed against the exterior of the glass bell in the relation shown in Figs. 1 and 2.

The lower portion of the glass bell is provided with a metal rim, generally indicated at 39, and upon this rim is mounted the heating element 26. This rim is equipped at a point opposite the hinge 22 with a manual manipulating portion in the nature of a lip 40 which may be grasped for lifting the hinged bell. Adjacent the lip is a latching lever 41 which serves to latch the bell to the base, as hereinafter more particularly described.

The heating elements 26 and 30 are advantageously constructed of demountable coiled wire, and in the embodiment shown the spit 24 is provided interiorly with a heating element 42 formed by a coil of wire, said coil being connected in the circuit in the manner hereinafter described.

In plan, the bell-shaped member which forms the cooking chamber is oval in shape in a general way, having its smaller end adjacent the hinge connection with the base, as will be evident from Fig. 2. The base in plan is of the same general shape, and the base is somewhat larger than the bell-shaped part, the latter, however, having the lateral rim 39 of metal, and said lateral rim overlying a correspondingly shaped rim 43 (Fig. 4) with which the base is provided. The base is somewhat longer than the glass part of the bell portion or cover, and is somewhat pointed adjacent the hinge 22, as appears from Fig. 4. The glass part of the cover at its left-hand end (Fig. 2) in plan is curved on an arc, and at the right-hand end curved on a smaller arc. At the right-hand end (Fig. 3) the metal cover 38 is carried down to the lower part of the cover on a slant, and in this region the metal part of the cover is shaped to conform in plan and to overlie the rather pointed portion of the base. The cover is higher toward the left-hand end (Fig. 3) than toward the right-hand end, there being a downward slope in the direction of the hinge from a domed part that is near the left-hand end (Fig. 3). The upper part of the cover, and more especially the glass portion thereof, is curved in transverse section, as will be apparent from Figs. 2A and 5, to present an upper cover part that is dome-shaped and lends itself to the radiation of the heat rays in a converging manner with respect to the spit axis, the dome being somewhat narrowed toward the right (Fig. 3) and being slanted downwardly somewhat toward the right (Fig. 3) or toward the hinge mounting of the cover. The heating element 30 is arranged in the form of a loop having one end, i. e. the rear end, somewhat narrower than the other so as to conform generally in shape to the neighboring part of the dome, as above described. The thermostat 32 has its casing projecting to an extent into the heating chamber approximately centrally of the heating loop. The reflector 31 corresponds generally in shape to the heating loop, extending laterally beyond the loop to some extent, as shown in Fig. 9, and the reflector or plate is curved to correspond generally to the dome shape of the chamber, and is spaced downwardly to a slight extent only from the upper surface of the chamber. The heating element is mounted on this reflector or plate by passing through spool-shaped insulators supported from the plate in any suitable manner.

The base 20 is constructed of sheet metal and is suitably weighted to afford firm support of the appliance, some of the weight being contributed by heavy feet 45 at the larger end. Adjacent the lower part of the cooking chamber the base has an insert 46 provided by a sheet metal element that underlies the pan element 25 and serves as a base for said element. The insert 46 is somewhat larger than the pan element, and is dished to provide a reflector that will reflect heat waves in an upward direction. Between the insert 46 and the wall 47 of the base 20 is an air chamber 48 which serves for heat insulation, and the insert or reflector 46 is supported upon heat-insulating pads 49 provided in this space, the object being to prevent heating of the base to a point where it will injure the table or other support on which the cooking appliance is placed.

The insert or reflector 46 has a right-hand straight edge (Fig. 3) that is substantially in line with the inner glass shell of the cover, and at the left-hand end (Fig. 3) the reflector has a curved portion spaced inwardly somewhat from the margin of the base and located adjacent an inwardly extending flange 50 with which the base is provided. The flange 50 is provided with a slot 51, and the latch device 41 previously mentioned has a hook end 52 adapted to enter the slot 51 for locking the cover to the base (Fig. 7). The latch 41 is in the shape of an elbow lever pivoted at 53 on the rim of the cover member and acted upon by a spring 54. One end of the latch lever carries an extension in the form of a button 55, the depression of which against the action of the spring 54 will swing the latch lever to a position in which the cover will be released from the base for upward movement.

The pan element 25 is in general of the same shape as the reflector 46 upon which it rests. In addition to its dished main part 56, it is provided with a peripheral trough that provides a preferred form of water pool, the trough being indicated at 59. When the cover is raised the trough can be readily filled with water. It is preferably a relatively narrow trough that in general follows the contour of the cooking chamber, the trough being accessible to heat waves coming from above, and the water vapor rising from the trough when the latter is subjected to heat being in a location such that it can pass directly upward into the peripheral part of the cooking chamber. In addition to being subject to the heating effect of the heating element 30, the water in the trough is subject to the heating effect of the contiguous heating element 26, the latter being spaced only slightly upwardly from the trough and in general registry therewith. The heating element 26 is composed of a coil of wire passing through insulators 60 mounted upon the metallic rim portion of the glass bell. The rim portion 39 is shown in detail in Fig. 7, and it will be seen that it comprises a sheet metal element providing an outstanding rim and of a cross-sectional shape such that it presents an angle 61 in which the outer glass 28 rests. Another rim piece 62 provides an angle 63 in which the inner glass 27 rests. Inserted piece 64 is fastened as by welding to the angle 61, and screws 65 pass through holes in part 62 and engage threaded sockets in the piece 64. The insulators 60 are applied to the part 62 by brackets 66.

The cover piece 38 previously described is suitably fastened as by screws 67 to a chambered portion 68 of the cover rim, which portion 68 has the hinge 22 connected to it and is provided with an interior chamber 69 in which a portion of the motor 23 is disposed. The motor 23 is fixed upon a block 70 mounted in a chamber in the base 20. The motor has a depending shaft provided with a worm 71 that meshes with a gear 72 carried by a shaft 73 mounted horizontally within the base, and the shaft 73 has fixed on it a worm 74 engaging a gear 75 fixed on a spit-receiving sleeve 76 that is rotatably supported by the block 70. The spit 24 is frictionally fitted within the sleeve 76 so as to be turned by said sleeve. Secured to the spit is a guard or deflector 77 shaped as a disk and arranged to prevent meat juices and the like from getting into the spit sleeve. Juices striking the guard 77 will be deflected so as to pass down into the body portion of the pan 25.

The spit 24 is continued to the right (Fig. 3) through the block 70 and has a projecting part by means of which suitable electrical connections are made with its interior heating element 42. For this purpose the projecting end of the spit is provided with a knob 78 engaging a spring contact 79. The knob 78 is electrically connected to one terminal of the heating element, and the other terminal is insulated from the first and led to a sleeve 80 which is insulated from the knob 78 which rotates with the spit. A slip contact 81 makes contact with this sleeve. The slip contact or brush 79 and the other slip contact or brush 81 are connected to the main electrical circuit in the manner hereinafter described.

It will be noted from Fig. 4 that the spit is in the longitudinal median axis of the cooking chamber, and it will be noted from Fig. 3 that it is inclined upwardly from the vicinity of the hinged end of the base so as to have its pointed end well up in the cooking chamber and its operative portion holding the food, or adapted to hold food, located in the cooking chamber in general parallelism to the slanting roof of the chamber. In this particular case the angle of the spit to a horizontal plane is approximately 20°, but obviously variation may be made in this respect if desired. The motor is preferably arranged to rotate the spit at about 20 R. P. M., but this also is only by way of example.

Within the air space 29 between the outer and inner glass shells, in the region adjacent which the heating element 30 is provided, there is arranged an upwardly facing metal dished drip pan element 82, which serves to reflect toward the spit axis heat waves from the element 30, and also to receive any water of condensation from the outer shell. This member 82 has its body in contact with the inner glass shell. The thermostat 32 has its casing received in a correspondingly shaped opening in a plug 83 of suitable heat-insulating material that is received in an opening in the slanting portion of the glass cover above the heating element, the plug 83 being surrrounded by spacing washers of heat-insulating material that space apart the two glass shells in the manner shown in Fig. 3. As shown in Fig. 3 there is a spacing washer between the reflector 31 and the inner face of the glass shell 27; there is a spacing washer between the outer face of glass shell 27 and the inner face of shell 28; and there is a spacing washer between the outer face of shell 28 and the inner face of the metal member 37 previously mentioned, which member 37 in general is of channel-shaped cross section, as shown in Fig. 5. Screws 84 pass through the reflector 31, the plug 83, and into the channel member 37 for tying all of the parts together, and, as will be noted from Fig. 3 and Fig. 5, the thermostat 32 has its casing provided with an enlarged upper portion 32ᵃ that is held in a socket in the plug 83 by the overlying channel part 37, said channel part being provided with an aperture 85 through which extends upwardly an axially movable stem 86 which is acted upon by the thermostat device. As will be noted from Fig. 5, the lower narrower part of the thermostat casing which projects into the cooking chamber is filled with a suitable fluid, and the upper wider part of the thermostat casing contains a bellows 87 which expands and contracts in response to changes of temperature of the fluid. The bellows 87 has its interior in communication with the atmosphere by way of the aperture 85, and is contained in a chamber into which vapor from the sensitive fluid passes when a predetermined temperature is reached, thereby collapsing the bellows and lifting the stem 86 and the attached end of the control lever 33. In the preferred practice, as hereinafter set forth, the thermostat is arranged to lift the end of the control lever when a temperature of 450° F. is reached in the cooking chamber, so as to thereby cause the control lever to throw the switch 35 into the "off" position. The lever 33 is preferably of channeled cross section, having its channel facing into the channel of the mounting member 37, and the connection of stem 86 with the control lever is adjustable, the stem having a part threaded into a socket in the lever, and the stem being provided with a lock nut 88 for fixing the parts in the adjusted position.

In the roof portion of the cooking chamber adjacent the thermostat device is a venting device 89 which is adapted to permit the venting of vapors from the cooking chamber when the temperature within the chamber reaches a certain value. This device comprises a tubular casing 90 mounted in a through opening in the plug 83, and having its inner end projecting into the chamber, as shown in Fig. 5, said end being provided with lateral apertures 91 affording an inlet for vapors from the chamber. In the casing 90 is a stem 92 carrying at the upper end a valve 93 adapted to be seated against a seat 94 for closing the casing at its upper end in order to prevent exit of vapors. Acting against the lower end of stem 92 is a small bellows 95, and a coil compression spring 96 is interposed between the bellows and the shoulder provided by the valve seat 94. In the preferred practice the bellows 95 will be so constructed that when a temperature slightly below 450° is reached the bellows will be expanded in order to raise the valve 93 and vent the vapors from the chamber.

The vapors that pass by the valve seat 94 enter the hollow cover member 38, and pass out of the chamber in this cover member through suitable small vent holes such as those indicated at 97 in Fig. 5.

A certain amount of air is in the cooking chamber when the cover is closed down, and additional air enters adjacent the lower edge of the cover where there is provision for admitting a certain amount of air. The entering air may take a course indicated by the arrows in Fig. 7, passing in between the rims of the cover and base. The parts are so proportioned that there is a certain ratio between the entering air and the vapor by volume, and preferably the vapor is about 25 per cent of the air.

For the purpose of controlling the pivoting movement of the cover, it is preferred to connect the base and the cover by articulated spring-pressed members such as shown in Figs. 4, 10 and 11. These members provide means for limiting the upward movement of the cover at a certain point, and they also preferably provide means for counterbalancing the weight of the cover and facilitating its upward movement. The construction of these members may be considerably varied, but in the preferred form as shown the device comprises an arm 99 pivoted to the cover at its upper end, and pivoted at its lower end to a similar arm 100 the lower end of which is pivoted to the base. The arms 99 and 100 are of channeled cross section, and are provided with stops which interengage when the position shown in Fig. 10 is reached. The pivot member 101 which pivots one arm to the other is surrounded by a coil 102 of a spring which has one branch 103 reacting against one arm and a branch 104 reacting against the other arm, the tendency of this spring being to lift the cover.

The channel member 37 is, for the most part, spaced outwardly to a slight extent from the upper surface of the glass dome, and is curved to conform to the shape of the dome, as shown in Fig. 3, and at its lower end is extended into the chamber provided within the lower part of the cover plate 38. The lower terminal portion of the channel member is bent away from the glass shell at a slight angle, as shown at 106, and this portion of the channel member is attached in a suitable manner to the cover plate 38. The portion 106 serves as a mounting for the time clock 36 which is applied to the outer face of said portion, and suitably secured thereto. The time clock mechanism has a stem 107 projecting outwardly through an opening in the cover plate, and fixed on the outer end of the stem is a suitable handle 108. In association with the upper wall of the time clock casing is an actuating disk 109 fixed to the stem 107 and operating in the manner hereinafter described in cooperation with the control lever 33. The time clock is of a well-known kind, the same being wound by turning the handle in one direction to a suitable setting, where the handle registers with a point on a suitable scale 110 on the cover member, which point indicates a predetermined time interval, and then when released the handle moves back to the zero position as the spring unwinds.

Fixed within the chamber above mentioned and in a location above the time clock 36 is the switch 35, which serves for opening and closing the circuit. This switch has an operating arm 111 which projects out of its box-like casing 112. The switch arm operates in an aperture in the casing and moves laterally in this aperture, the arrangement being such that when it is at one side of the aperture the switch is on, and when at the other side it is off. The "on" position is shown in Fig. 3, and the "off" position in Fig. 12. The switch is spring biased so as normally to be in the "on" position. Adjacent its lower end the control lever has a lip 113 positioned against the side face of the switch arm, and when the lever is moved from the position shown in Fig. 3 to that shown in Fig. 12 the switch is moved to the "off" position. The upper end of the lever is connected to the thermostat stem in the manner previously described at a point to one side of the lever fulcrum 34. The lever extends to an appreciable distance beyond the other side of the fulcrum, and in order to counterbalance it to an extent a compression spring 114 is interposed between the lever and its supporting channel. This spring has a tendency to move the lower end of the lever (Fig. 3) outwardly.

The lower end of the lever has an operative connection with the time clock, and for this purpose is provided with a finger 115. In the operation of cooking an article in the apparatus, the actuating disk 109 turns idly until the handle 108 reaches the zero position, at which time a cam lug 116 on the disk engages the finger 115 to thereby cam the lower end of lever 33 in an inward direction and interrupt the circuit.

There is also provision for opening the electrical circuit automatically when the cover of the appliance is raised, because when it is raised no further heating will be desired. The mechanism for interrupting the circuit in this way can take different forms, but it is preferred to provide supplementary means for moving the lower end of the control lever inwardly with reference to the heating chamber. In the form shown a bell crank lever 117 is pivoted intermediate of its ends at 118 in a location below the timer. This lever has a lower arm 119 connected by a spring 120 with a lug 121 on the block 70, and the lever 117 has an upper arm 122 making contact with a finger 123 extending downwardly from the lower end of the control lever. When the cover of the appliance is lifted, the spring 120 pulls against the lever 117 in a manner to cause the finger 123 to be moved for the purpose of shifting switch 35 to the "off" position.

For purposes of clearness I have omitted in the principal views of the drawing a showing of the electrical connections to the motor 23 and to the heating resistances. It will be noted, however, that in a preferred location, for example as shown in Fig. 1, the base 20 is equipped with prongs 124 for an external plug connection to the house circuit. As shown, it is preferred to have the plug connectible to the base at one side and near the hinged end of the base. As shown in the diagram, Fig. 13, the prongs 124 are connected to leads 125 and 126 that extend to the motor and to the heating resistances. In the diagram, Fig. 13, the cut-off switch 35 is in the lead or branch 125, and the two leads 125 and 126 are connected to the ends of the heating element 26. The other heating elements 30 and 42 are shunted across the leads, as is also the motor. This arrangement, however, is only by way of example, and other suitable arrangements can be used if desired.

As far as the electrical devices are concerned, it will be understood that when the cover is raised the circuit will be open, and that when it is closed the circuit will be open as long as the control handle 108 of the timer is in the zero position, because in the zero position the disk 109 of the timer will hold the control lever in a position such that the switch 35 is open.

The pan 25 may have its dished body portion provided with integral cross ribs such as 56ª and 56ᵇ, which divide it into compartments. In this particular case four compartments are provided, and these may, if desired, be used in cooking vegetables and the like that are placed within the compartments.

In cooking an article in the appliance, the trough in the pan is filled with water, the cover is closed, the control handle moved a suitable distance so as to close the circuit, and the heat generated within the cooking chamber acts upon the water pool to establish a rising curtain of vapor adjacent the side walls of the chamber. In establishing this curtain the lower heating element 26, which is placed immediately above the water trough, is especially effective, and the heating effect is increased by the heat radiated downwardly from heating element 30 and reflected back from the pan 25 and from the metallic reflector 46 on which the pan 25 is supported. Also, of course, a certain amount of heat is derived from the heating element within the spit. The thermostat device is preferably set to actuate the control lever for opening the circuit when the temperature adjacent the thermostat reaches a temperature of the order of 450° F. Water will be evaporated from the water pool, and a curtain of vapor will be established in a very short time, with the water in the pool simmering and the temperature of the pan being in the neighborhood of 200° F. The cover is lifted after the curtain has been established, the comestible to be cooked placed in the heating chamber, and the timer handle turned on the scale to the proper point for the desired cooking period. It may be assumed that a chicken is placed on the spit, which will be revolved by the motor, but a roast cut of meat could be placed on the spit, or a grid could be placed upon the spit to hold chops or the like. Also vegetables could be placed in the pan. For simplicity of description, however, it will be assumed that a chicken is placed on the spit for cooking.

The vapor rising around the chicken in a ring-like curtain acts to modify in a beneficial manner the heating effect of the upper and lower heating elements. In the lower part of the chamber is a curtain of vapor and in the upper part the vapor is converted into superheated steam, and as such steam is invisible, the chicken being cooked is readily visible through the glass cover. The heat from above is, of course, radiant heat, and from below heat is radiated and reflected upwardly from the pan and its supporting reflector. This heat is modified by the surrounding curtain or shroud of vapor, which latter has the effect of keeping the meat moist and browning the exterior, and preventing appreciable loss of juices. A certain amount of fatty dripping passes down into the pan, but this is not prejudicial. The vapor curtain is, of course, produced at a level below the chicken, and the water pool is farther away from the radiant heat source in the upper part of the chamber than is the chicken, which is a beneficial arrangement so far as the creation of an effective vapor curtain is concerned. The radiant heat is absorbed by the chicken, and at the same time heat reaches it by radiation and convection from below, and a certain amount of cooking heat is induced in the chicken by the heating element within the spit. The rotation of the spit, of course, means that the atmosphere within the cooking chamber is agitated to produce convection currents of air and vapor that aid considerably in speeding the cooking process and in preventing a concentration of heat at one or more points. In other words, the cooking is uniform in the different parts of the article. The walls of the chamber are, of course, so shaped that heat rays from the upper part of the chamber converge toward the spit axis, and this has the result of preventing loss of heat and of speeding the process.

The article is cooked very rapidly by the new process, with elimination of drying, substantial shrinkage and loss of juices, and the vapor curtain or blanket has the effect of preventing exchange of odors between different comestibles if they are cooked in the chamber simultaneously.

Usually it takes from three to seven minutes to establish the vapor curtain and bring the gaseous contents of the cooking chamber to the temperature of approximately 450° F.

In the process, radiated heat is transmitted through the vapor curtain, which latter provides a moist and very hot vapor seal over the superficies of the article.

When a chicken is cooked, it takes on very quickly a golden brown color, and swells to a considerable extent as a result of the sealing action on the outer surface or skin. The chicken is usually completely cooked after being left in the chamber for a period measured by allowing from three to seven minutes for each pound of its weight. The induced heat provided by the heating unit in the spit shortens the cooking period.

In the present process the article on the spit rotates to present all parts of its external surfaces uniformly to radiant heat from the upper part of the chamber, such radiant heat penetrating and acting through a curtain of vapor that rises from below in ring-like form around the article and moves over the upper part of the article in a dome formation to an upper vent, the rising curtain of vapor being created in part as a result of the entrance of air into the chamber at the lower circumference thereof, and the exit provided in association with the dome of the chamber. The exit is opened for the exit of vapor and gases at the upper part of the chamber as soon as the temperature adjacent the exit reaches a point a few degrees, e. g. 10°, below the temperature setting of the thermostat, which is of the order of 450° F. It is understood, of course, that the heating means for the chamber would, in continuous operation, produce in the upper part of the chamber a temperature in excess of 450° F., but that through the action of the thermostat the temperature of the chamber, including its aqueous vapor, is maintained practically constant at 450° F. The curtain of vapor is also created in part as a result of the heating effect of the different heating elements, including the lowermost element which is disposed in loop form closely above and substantially in line with the water trough, so as to heat the water in a direct manner. The air entering the appliance at the lower part travels inwardly over the trough, and the vapor rises over the contiguous heating element. The base portion of the appliance is effectively cooled by the evaporation of water and by the provision of an insulating air space, as previously described, and the upper part or cover of the appliance is effectively cooled at the external part by the air space between the glass shells.

In Figs. 14 and 15 of the drawings I have shown a modified form of the apparatus intended more particularly for commercial use rather than home use, but embodying the same general principles. Here the upper portion only of the apparatus is shown, inasmuch as the lower part contains mainly mechanism serving the function of raising and lowering the base portion of the heating chamber and rotating two or more spits, which mechanism forms no part of the present invention. The apparatus here disclosed comprises tubular standards 127 having interior guides for a vertically movable transverse support 128 having its ends working in said guides, said transverse support serving as a vertically movable mounting for a pan 129, in which are disposed three vertical spits 130, each having an underlying drip pan 131. Associated with the transverse support and the pan are means, forming no part of the present invention, whereby the spits are rotated. The pan forms a vertically movable closure for a cooking chamber mounted on the standards above the pan in a stationary position, there being an air space around the periphery of the pan whereby air can enter the chamber at its lower part. The chamber for the most part is constituted by inner and outer bells or shells of glass spaced apart to provide an air space, but in this case the bells are of cylindrical shape having cylindrical side walls and flat tops. The outer shell is indicated at 132, the air space at 133, and the inner shell at 134. These shells are fastened at their lower edges in a metallic rim structure, generally indicated at 135, there being an air space around the pan between it and the lower edge of this rim structure. The rim structure has a supplementay inner part 136 receiving the inner glass shell and serving as a mounting for a lower circular heating resistance 137 supported by brackets 138. The pan 129 has a peripheral trough 139 creating an annular water pool disposed in the peripheral part of the cooking chamber and having a heating element 137 directly above it. In the upper part of the cooking chamber is a metallic reflector 140 having a cylindrical depending side wall and a flat top wall, and at the lower edge of the side wall a circular heating resistance 141 is supported by brackets. The heat from the element 141 is radiated downwardly upon the articles carried by the spits. The reflector 140 has at its upper central part, axially of the cooking chamber, a vent 142 that is in communication with a vent 143 that leads into an upper chamber 144 provided in the upper part of the apparatus by suitable sheet metal parts, said chamber having a ceiling member 145 provided with suitable vent openings 146, whereby vapors and gases rising in the cooking chamber can pass readily inwardly to create a curtain that is of dome shape, and whereby the vapor can have egress at the upper part of the chamber so as to pass to the atmosphere. Upon the top of the inner glass shell 134 a metal reflector 147 is arranged.

For loading the cooking chamber with articles to be cooked, the transverse support and the associated pan and spits are lowered to a position where the spits are accessible, and after loading the parts are restored to the position shown in Fig. 14. In this position the upper and lower heating coils can be energized, and this can be done for the formation of the enveloping curtain of vapor before the food is introduced into the chamber, as in the form first described. In general, the process of cooking is the same as in the form first described.

In the form first described the appliance is very suitable for home use, taking up small space and being readily portable and being readily connectible to any convenient wall plug. The device is very easy and convenient to operate, and inasmuch as it cooks various articles in a much shorter time than is possible with the ordinary stove, the value of the appliance as a household aid is apparent. There is ample provision for preventing the external surfaces of the device from being heated to an undue degree, and by providing automatic controls, as above described, optimum results can be obtained with a minimum amount of care and attention. All that is required in the way of setting is manipulation of the time clock to control the heating period. Until the end of the heating period the temperature in the chamber will be maintained constant without requiring any manipulation or other attention. As has been indicated above, the structure is such that, upon removing the article from the chamber after cooking, the heating current will be automatically cut off and cannot be restored to heating status without special manipulation.

In the form first described the upper heating element may be of 500 watts, and the bottom heating element may be one of 1,000 watts, and the heating element in the spit may be one of 500 watts. The bottom element is demountable to permit cleaning.

In the form first described it may be preferred in some instances to preheat the chamber before the water pool is supplied with water. Then, when the water is poured into the trough, the vapor curtain is quickly created.

By making the heating element adjacent the lower edge of the glass dome demountable, along with its carrying rim or frame, the space between the glass shells is accessible for cleaning.

In the form first described the reflector 46 is supported and insulated by the pads of fibrous heat-insulating material on which it rests, and its edge is out of contact with the adjacent parts of the base so that it will not carry heat into the base structure.

While two forms of the apparatus are shown by way of example, various other forms can be used and the procedure modified and changed without departing from the principles of the invention or the scope of the claims.

I do not claim herein the disclosed apparatus, as the apparatus forms the subject matter of my divisional application, Serial No. 192,994, filed October 30, 1950.

What I claim is:

1. The method of cooking an article of food which comprises disposing the article in a cooking chamber having an outlet or vent located above the article, creating a curtain of vapor moving upwardly within the chamber over the article and to the vent, and applying radiant heat to the article through the curtain.

2. The method of cooking an article of food which comprises disposing the article in a cooking chamber, creating a curtain of vapor moving upwardly within the chamber over the article, applying radiant heat to the article through the curtain, and moving the article within the curtain for equalizing the cooking effect on different portions of the article.

3. The method of cooking an article of food which comprises disposing the article within a cooking chamber so that it is spaced at all points from the chamber walls, creating a rising curtain of vapor surrounding the article, applying radiant heat to the curtain and article from above, applying radiant heat to the curtain and article from below, and maintaining the article constantly in rotation within the curtain.

4. The method of cooking an article of food which comprises disposing the article within a cooking chamber so that it is spaced at all points from the chamber walls, creating a rising curtain of vapor surrounding the article, applying radiant heat to the curtain and article from above, applying reflected heat to the curtain and article from below, maintaining the article constantly in motion within the curtain, and inducing heat in the article while it is in motion.

5. The method of cooking an article of food which consists in disposing it within a heating chamber so that it is spaced at all points from the walls of the chamber, providing a rising curtain of vapor which passes over the upper part of the article, applying radiant heat to the curtain and article from above, and rotating the article so that its external surface is uniformly heated.

6. The method of cooking an article of food which consists in disposing it within a heating chamber so that it is spaced at all points from the walls of the chamber, providing a rising curtain of vapor which passes over the upper part of the article, applying radiant heat to the curtain and article from above, rotating the article so that its external surface is uniformly heated, the article being mounted on a rotating spit, and inducing heat in the article from the spit.

7. The method of cooking an article of food which comprises disposing it within a heating chamber so that it is spaced at all points from the walls of the chamber, producing a rising curtain of vapor from a liquid body in the lower part of the chamber which curtain passes around and over the upper part of the article, applying radiant heat from above and below to the article through said curtain of vapor, and rotating the article so that its external surface is substantially uniformly heated.

8. The method of cooking an article of food which consists in disposing it within a heating chamber so that it is spaced at all points from the walls of the chamber, producing within the chamber from a liquid body extending around the article at a level somewhat below the article a rising curtain of vapor which passes over the upper part of the article, applying radiant heat to the article from above and below through the curtain of vapor, and turning the article constantly about an axis disposed within the vapor curtain.

9. The method of roasting meat which consists in placing the meat within a heating chamber so that the meat is spaced at all points from the walls of the chamber, producing in the chamber from a body of liquid disposed at a level somewhat below the meat a rising curtain of vapor which passes upwardly around and over the meat, applying radiant heat to the meat through the vapor curtain from locations above and below the meat, and turning the meat during the cooking process so that the meat is substantially uniformly cooked in all portions.

TOMUN FINIZIE.

REFERENCES CITED

The following references are of record in the file of this patent:

UNITED STATES PATENTS

| Number | Name | Date |
| --- | --- | --- |
| 2,060,232 | Manning et al. | Nov. 10, 1936 |
| 2,074,044 | Bushway | Mar. 16, 1937 |
| 2,339,973 | Austin | Jan. 25, 1944 |